(12) United States Patent
Uebbing

(10) Patent No.: US 6,328,484 B1
(45) Date of Patent: Dec. 11, 2001

(54) FIBER OPTIC LENS SYSTEM FOR COUPLING FIBERS TO SURFACE MOUNTED DEVICES

(75) Inventor: John Uebbing, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/517,141

(22) Filed: Mar. 2, 2000

(51) Int. Cl.[7] .................. G02B 6/42; G02B 6/30
(52) U.S. Cl. .................. 385/93; 385/47; 385/49; 385/88
(58) Field of Search .................. 385/47–49, 88–94

(56) References Cited

U.S. PATENT DOCUMENTS

| | | | |
|---|---|---|---|
| 3,901,582 | 8/1975 | Milton | 350/96 C |
| 4,173,390 | 11/1979 | Käch | 350/96.16 |
| 4,621,895 | 11/1986 | Motsko | 350/96.21 |
| 4,701,010 | 10/1987 | Roberts | 350/96.15 |
| 4,732,446 | * 3/1988 | Gipson et al. | 385/49 X |
| 5,325,459 | 6/1994 | Schmidt | 385/140 |
| 5,446,814 | 8/1995 | Kuo et al. | 385/31 |
| 5,546,212 | 8/1996 | Kunikane et al. | 359/163 |
| 5,661,835 | 8/1997 | Kato et al. | 385/92 |
| 5,786,925 | * 7/1998 | Goossen et al. | 385/49 X |
| 6,259,841 | * 7/2001 | Bhagavatula | 385/47 |

\* cited by examiner

*Primary Examiner*—John D. Lee

(57) ABSTRACT

A system for coupling a transmit fiber and a receive fiber to a light source and a photodetector, respectively, includes a unitary clear plastic member having lenses and total internal reflection (TIR) mirrors which cooperate to provide propagation along perpendicular X, Y and Z axes. The light source, photodetector and unitary optical member are surface mounted to a printed circuit board having drive circuitry for the light source and processing circuitry for the photodetector. By enabling surface mounting of the detector and light source, the cost of fabrication is significantly reduced.

17 Claims, 9 Drawing Sheets

FIBER OPTIC LENS SYSTEM FOR COUPLING FIBERS TO SURFACE MOUNTED DEVICES

TECHNICAL FIELD

The invention relates generally to systems for coupling signals using optical fiber equipment and more particularly to the coupling of signals between optical fibers and devices that generate or detect optical signals.

BACKGROUND ART

In communication applications, high-density packaging is an important issue. This is true whether the communications are based upon transmissions of electrical signals or optical signals. A related consideration is the cost of fabrication. The density of fiber optic modules that can be positioned along a printed circuit board (PCB) of a fiber optic-based Local Area Network (LAN) hub or similar system significantly impacts the per channel cost of the system.

Small-form fiber optic modules allow a high density of transmit and receive channels. Such modules include fiber optic transceivers which enable a light source to be coupled to a transmit fiber and allow a detector to be coupled to a receive fiber. FIG. 1 illustrates one known arrangement for coupling optical fibers 10 and 12 to a pair of solid state device packages 14 and 16 that are secured to a PCB, not shown. The optical fibers are embedded within a connector 18. For a standardized MT-RJ fiber pair, the center-to-center distance of the two fibers is 0.75 mm. For example, the connector may be a Mini-Mechanically-transferrable Push-On (Mini-MPO) connector type. Typically, the density of the transmitter and receiver channels is determined by the size requirements of the device packages. The solid state devices must be packaged to provide both optical and electrical isolation of the transmit and receive signals, as well as environmental protection. In the example shown in FIG. 1, the packages of the devices are shown as conventional Transistor Outline (TO) style cans. Each of the cans includes a pair of leads 20 and 22 that are soldered to the printed circuit board, which includes the drive and processing electronics for a transmitter chip 24 and a detector chip 26. The transmitter chip may be a light emitting diode (LED) or a laser diode. The detector chip 26 may be a photodiode.

The TO cans 14 and 16 of FIG. 1 are positioned such that when the connector 18 is inserted into a female connector seated on the same PCB as the TO cans, the exchange of optical signals is along a single plane. With regard to the transmit channel, the transmitter chip 24 generates an optical signal that is directed to a lens 28 of the TO can 14. The can lens 28 is cooperative with a collimating lens 30 to produce a collimated beam that impinges the mirror 32. The first mirror redirects the light path to a second mirror 34, which again redirects the light path for alignment with the transmit fiber 10. A lens 36 focuses the signal onto the aligned fiber 10.

The receive channel follows a path similar to the transmit channel, but in the opposite direction. Light from the fiber 12 is collimated by a lens 38 and impinges a third mirror 40. The redirected optical signal is again redirected by a fourth mirror 42. The optical signal is then operated upon by a lens 44 and a can lens 46 to focus the received signals onto the detector chip 26.

The arrangement of FIG. 1 provides beam translation along two axes, i.e., the X axis and the Z axis indicated in FIG. 1. This allows the spacing between the two channels to be increased from the 0.75 mm spacing of the connector 18 to a greater spacing between the two TO cans 14 and 16, e.g., a spacing of 6.2 mm.

Other optical couplers for connecting optical fibers to TO cans are known. U.S. Pat. No. 4,701,010 to Roberts describes a molded body having reflecting surfaces for connecting a fiber to a detector TO package or an emitter TO package. A slot extends into the body to allow insertion of a filter, such as a dichroic mirror, or a beam splitter, depending upon the desired application.

While the prior art systems operate well for their intended purposes, what is needed is a system that provides further reductions in the fabrication cost, without a sacrifice in optical performance.

SUMMARY OF THE INVENTION

A system for coupling optical fibers to optical devices includes lenses and mirrors which cooperate to provide propagation in perpendicular X, Y and Z directions, so that the devices can have a greater center-to-center spacing than the fibers and can be mounted to have axes perpendicular to the axes of the fibers. In the preferred embodiment, the optical devices include a light detector and a light transmitter that are surface mounted to a printed circuit board, while the lenses and mirrors are formed in a unitary optical member that is also mounted to the surface of the printed circuit board. By enabling surface mounting of the detector and transmitter, the cost of fabrication is reduced. Moreover, the surface mounting potentially reduces the circuit board real estate required for positioning the detector and the transmitter.

The optical member is made of a clear plastic material and includes a pair of light propagation paths that are mirror images of each other, but are oppositely directed. The term "clear" is defined herein as being characterized by low losses in the transmission of an optical signal. A first pair of input/output lenses is positioned on one surface of the optical member. Preferably, the input/output lenses are hyperbolic, so as to provide beam collimation. It is this first pair of input/output lenses that is aligned with the transmit optical fiber and the receive optical fiber. The lenses have axes that are aligned with a first pair of mirrors. The mirrors are total internal reflection (TIR) surfaces for reflecting optical signals. In the preferred embodiment, the TIR surfaces are at 45° angles to the axes of the associated lenses, so that right angle bending occurs. Each of the mirrors is aligned with a second mirror that provides right angle bending to a second pair of input/output lenses on a surface perpendicular to the surface having the first pair of input/output lenses. Again, the input/output lenses are preferably hyperbolic.

At the first surface, the optical member includes alignment pins or equivalent structure for ensuring precise registration between closely spaced duplex fibers and the first pair of lenses. At the opposite ends of the propagation paths, the second pair of lenses is aligned with a photodetector and a light source. For example, the photodetector may be a photodiode and the light source may be an LED or a laser diode. The photodetector and the light source are surface mounted on a PCB.

For the transmitter path, signals are generated by the light source, which is aligned with one of the lenses. The beam from the light source is collimated by the lens for propagation to a first TIR surface. The distance between the first lens and the first TIR surface defines a substratedirected segment of the transmit propagation path. The first TIR surface redirects the beam to a second TIR surface. The intermediate path segment between the two TIR surfaces is perpendicular to the substrate-directed segment and is parallel to the PCB on which the light source is mounted. The second TIR surface reflects the beam along a fiber-aligned segment to the hyperbolic lens which focuses the beam onto the transmit fiber.

For the receiver channel, the receive fiber directs optical signals to the hyperbolic lens having an axis that defines a fiber-aligned segment of a receiver propagation path. The beam is collimated by the lens and is reflected by a TIR surface to an intermediate segment of the path. The beam is again reflected to a substrate-directed segment aligned with the hyperbolic lens which focuses the beam onto the photodetector.

An advantage of the invention is that the photodetector and the light source are mounted directly to the PCB. The two devices may be mechanically and electrically mounted using a silver or gold epoxy to a gold-plated PCB that includes the processing electronics for the photodetector and the drive electronics for the light source. An advantage of the invention is that the mounting of the photodetector and light source is less expensive than the packaging associated with conventional TO cans. Moreover, the surface mounting may enable the devices to be more closely spaced than when the devices are mounted within separate TO cans. For the optical member formed in accordance with the invention, the spacing between the substratedirected hyperbolic lenses is determined by the intermediate segments of the propagation paths through the optical member.

DETAILED DESCRIPTION

Figure 1:
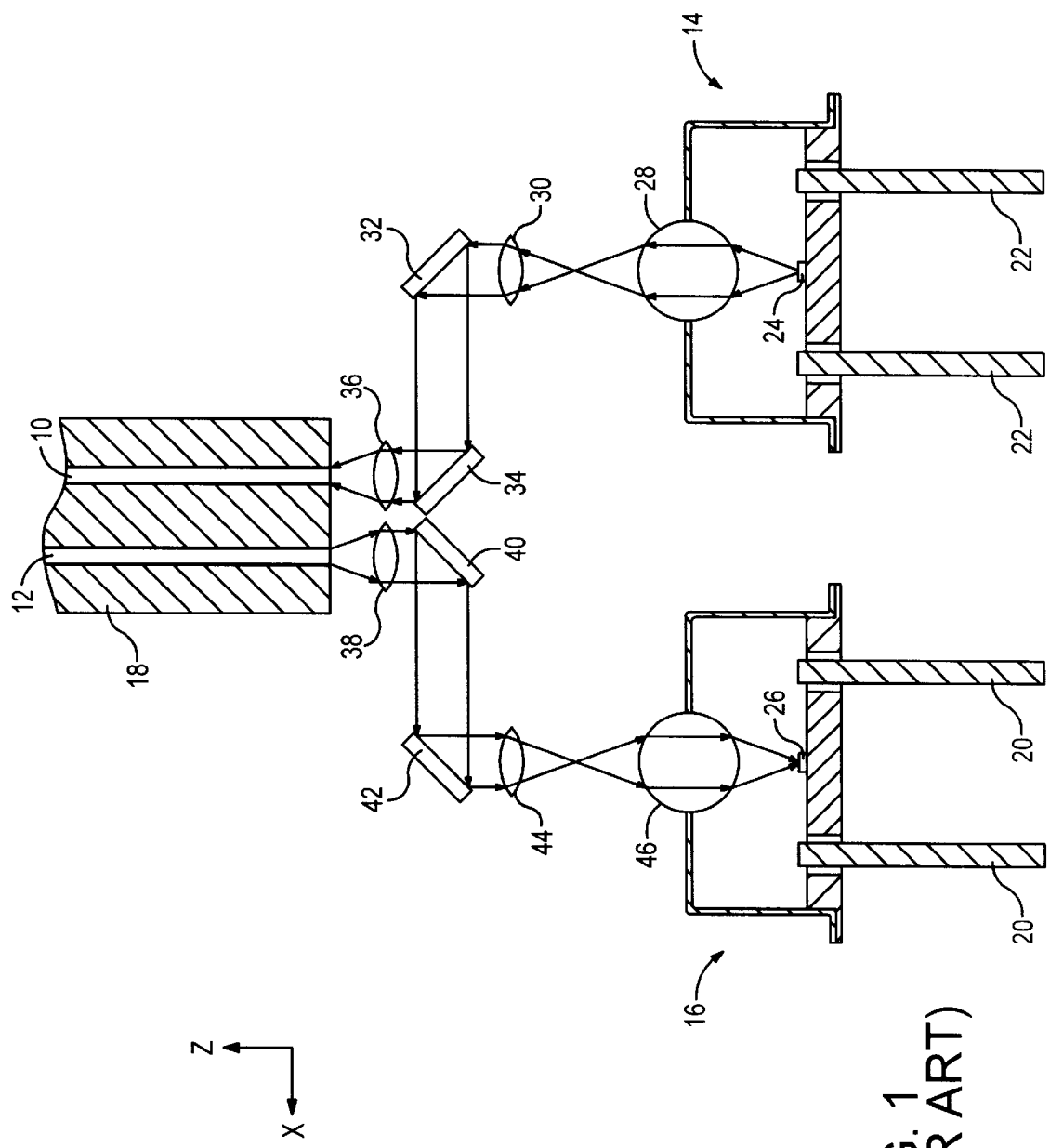
FIG. 1 is a schematic view of a prior art approach to coupling optical fibers to light generating and light detecting devices.
Figure 2:
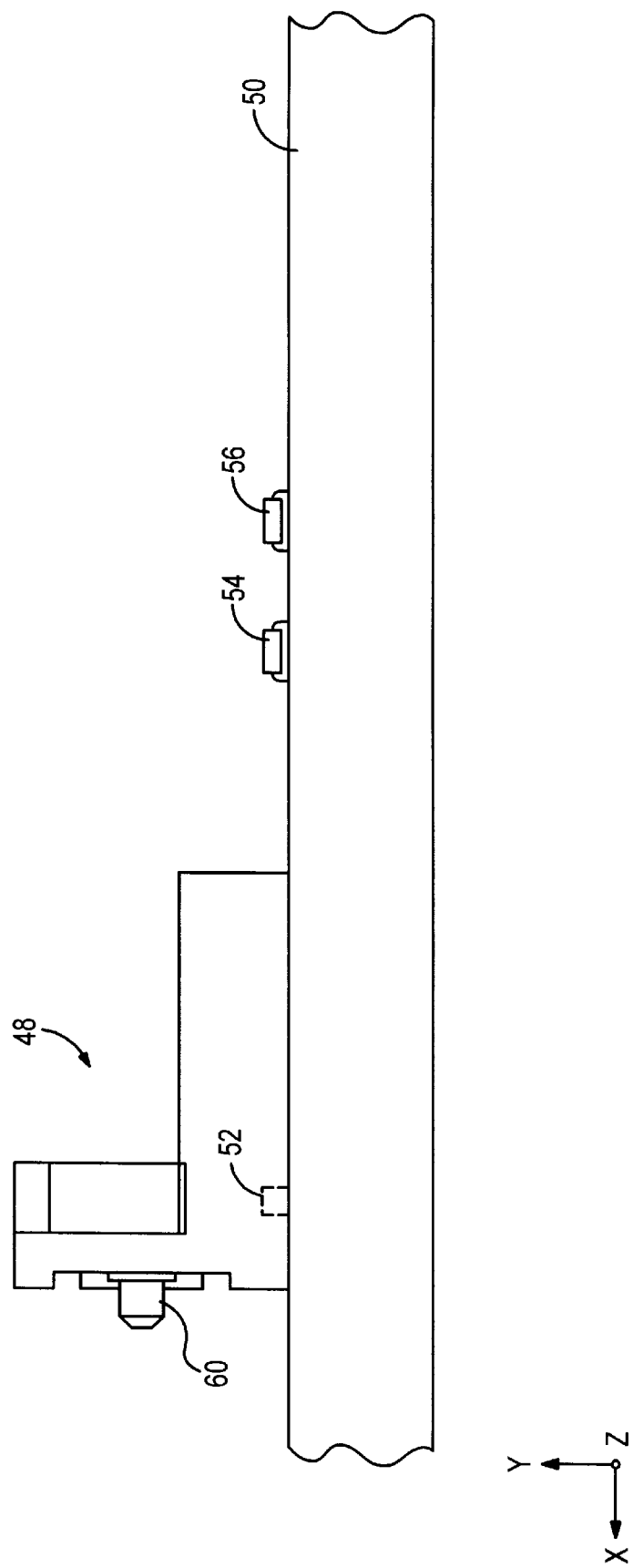
FIG. 2 is a side view of a surface mounted optical member and surface mounted electronic devices for providing optical coupling to fibers in accordance with the invention.

With reference to FIG. 2, an optical member 48 is shown as being mounted to a surface of a printed circuit board (PCB) 50. The PCB also includes a surface mounted light source and a surface mounted photo-detector. Only one of the surface mounted electronic devices 52 is shown in the side view of FIG. 2. Integrated circuit chips 54 and 56 represent the drive circuitry for the light source and the processing circuitry for the photodetector. Such circuitry is well known in the art.

The optical member 48 is a fiber optic module optical system in which transmit and receive propagation paths have three segments, each segment being perpendicular to the other two segments. For the transmit propagation path, the beam from a light source (e.g., the device 52) is directed upwardly along the Y axis, inwardly along the Z axis, and then forwardly along the X axis. On the other hand, the receive propagation path is directed rearwardly along the X axis, outwardly along the Z axis, and then downwardly along the Y axis to the photodetector (e.g., the device 52).

Each of the propagation paths includes entrance and exit hyperbolic collimating and focusing lenses. Each path also includes a pair of TIR surfaces that provide 45° mirrors and right angle bending. The length of the intermediate path segments between the two mirrors determines the center-to-center spacing between the light source and the photodetector. That is, the lengths of the intermediate path segments determine the spacing between substrate-aligned path segments of the propagation paths. The fiber-aligned path segments are directed along the X axis. The distance between the fiber-aligned path segments is determined by the fiber-to-fiber distance of the mating fiber optic connector. In the preferred embodiment, the optical member 48 is designed for mating with a standardized MT-RJ fiber pair. According to the MT-RJ standard, the spacing is 0.75 mm. On the other hand, the separation of the light source and photodetector may be 6.2 mm. Therefore, in this embodiment, the intermediate path segments are each 2.725 mm in length (i.e., (6.2 mm–0.75 mm)/2).

The light source is an optical transmitter that may be an LED, a laser diode, or the like. The light source is pulsed to generate data signals for communication. The photodetector may be a photodiode or any other device that converts optical signals to corresponding electrical signals.

In the preferred embodiment, the optical member 48 is a unitary molded member that is configured to include four surface lenses and four TIR surfaces. While the mirrors will be described as being "total internal reflection" surfaces, some undesired scattering loss can occur at each surface.

Figure 3:
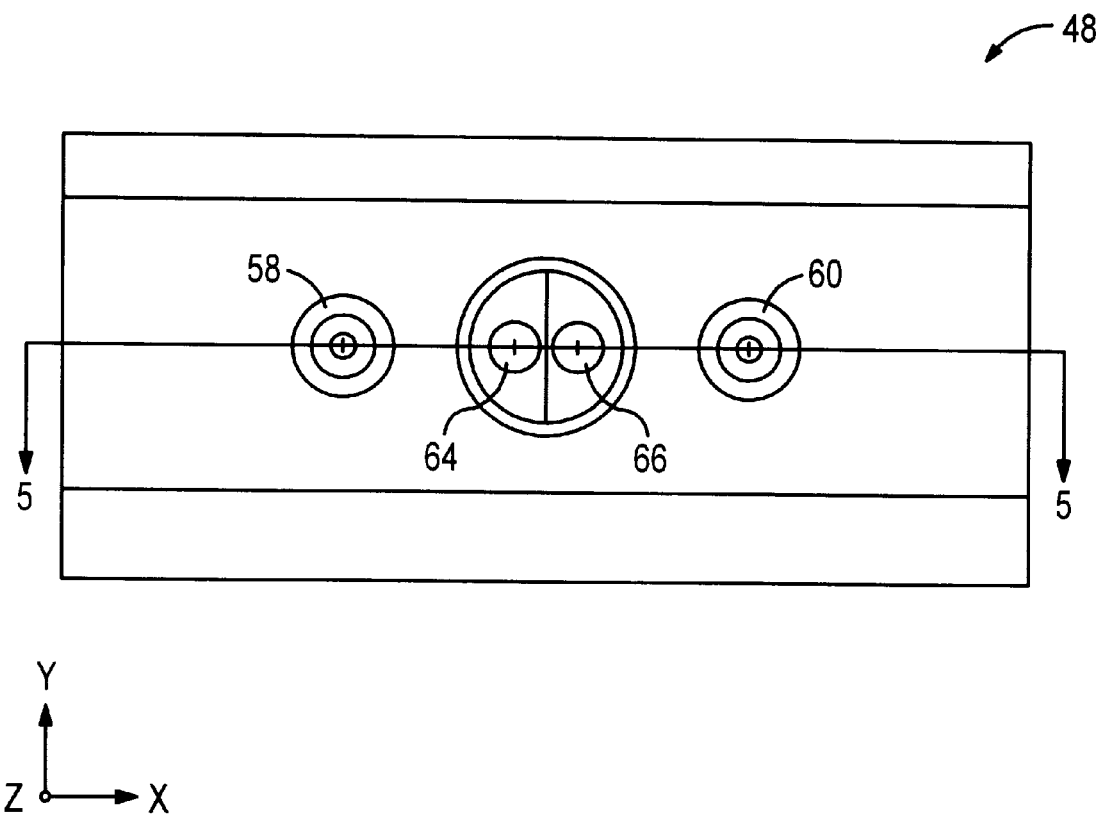
FIG. 3 is a front view of the optical member of FIG. 2.

FIG. 3 is a front view of the optical member 48. The molded plastic member includes two alignment pins 58 and 60 that are equidistantly spaced from the center. The alignment pins can directly contact a fiberbearing ferrule to ensure repeatable interfacing with the ferrule or can be utilized to properly position a precision metal plate (plate 62 in FIG. 6), which is used to ensure repeatable accurate interfacing with a fiber-bearing ferrule. A lens 64 is an exit port for a transmitter channel, while a separate lens 66 is an entrance port for the receiver channel. In the preferred embodiment, the lenses are hyperbolic lenses. For the transmitter channel, the hyperbolic lens 64 focuses an exit beam onto the aligned optical fiber. At the receiver channel, the hyperbolic lens 66 collimates the beam that is introduced into the optical member 48 from the aligned receive optical fiber.

Figure 4:
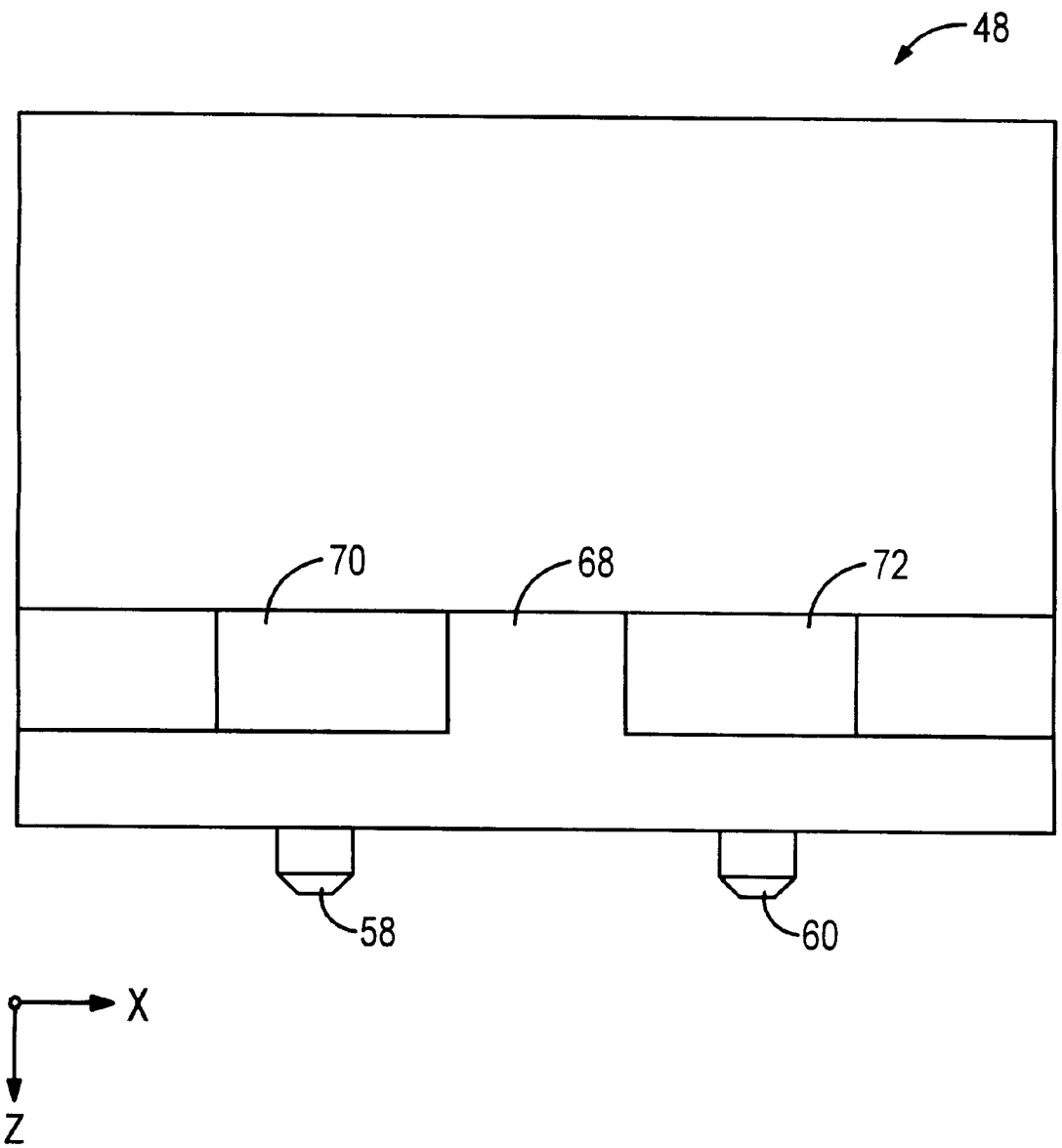
FIG. 4 is a top view of the optical member of FIG. 3.
Figure 5:
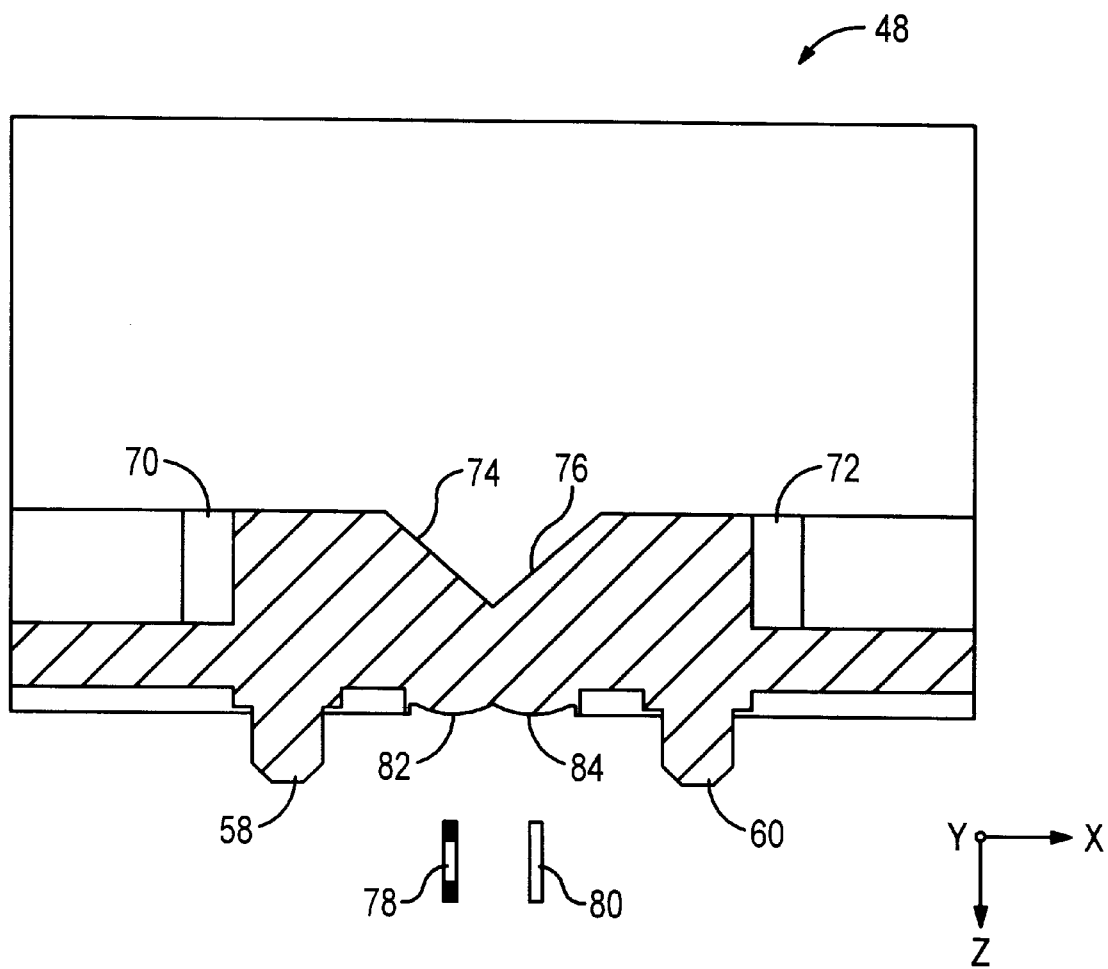
FIG. 5 is a top sectional view of the optical member of FIG. 3, taken along lines 5—5 of FIG. 3.

FIG. 4 is a top view of the optical member 48, while FIG. 5 is a top view taken along section lines 5—5 in FIG. 3. The optical member includes a planar upper region 68 and sloping regions 70 and 72 that are at 45° angles relative to the upper region. The configurations of the sloping regions can be seen more clearly in the rear views of FIGS. 8 and 9. As will be explained below, the sloping regions function as the TIR surfaces that reflect the transmit beam and receive beam between the X direction and the Z direction.

As best seen in the top sectional view of FIG. 5, the solid portion of the optical member 48 between the two sloping regions 70 and 72 includes a V-shaped cutaway that forms two TIR surfaces 74 and 76. These surfaces reflect the transmit and receive beams between propagation in the Z direction and propagation in the X direction. Also shown in FIG. 5 are a transmit fiber 78 and a receive fiber 80. The axis of the transmit fiber 78 is aligned with a hyperbolic focusing lens 82. The receive fiber 80 has an optical axis that is aligned with a hyperbolic collimating lens 84. A light signal that exits from the receive fiber 80 enters the optical member 48 at the hyperbolic focusing lens 82. The beam is reflected from the Z direction to the X direction by the TIR surface 76. The beam is then reflected from the X direction to the Y direction by the TIR surface that is formed by the sloping region 72.

The propagation path of an optical signal to the transmit fiber 78 follows an opposite path that is otherwise the mirror image of the receive path. That is, an upwardly directed optical signal along the Y axis is reflected to the X direction by the TIR surface formed by the sloping region 70. The redirected beam is again redirected to the Z direction by the TIR surface 74. The beam exits via the hyperbolic focusing lens 82, thereby being focused onto the transmit fiber 78.

Figure 6:
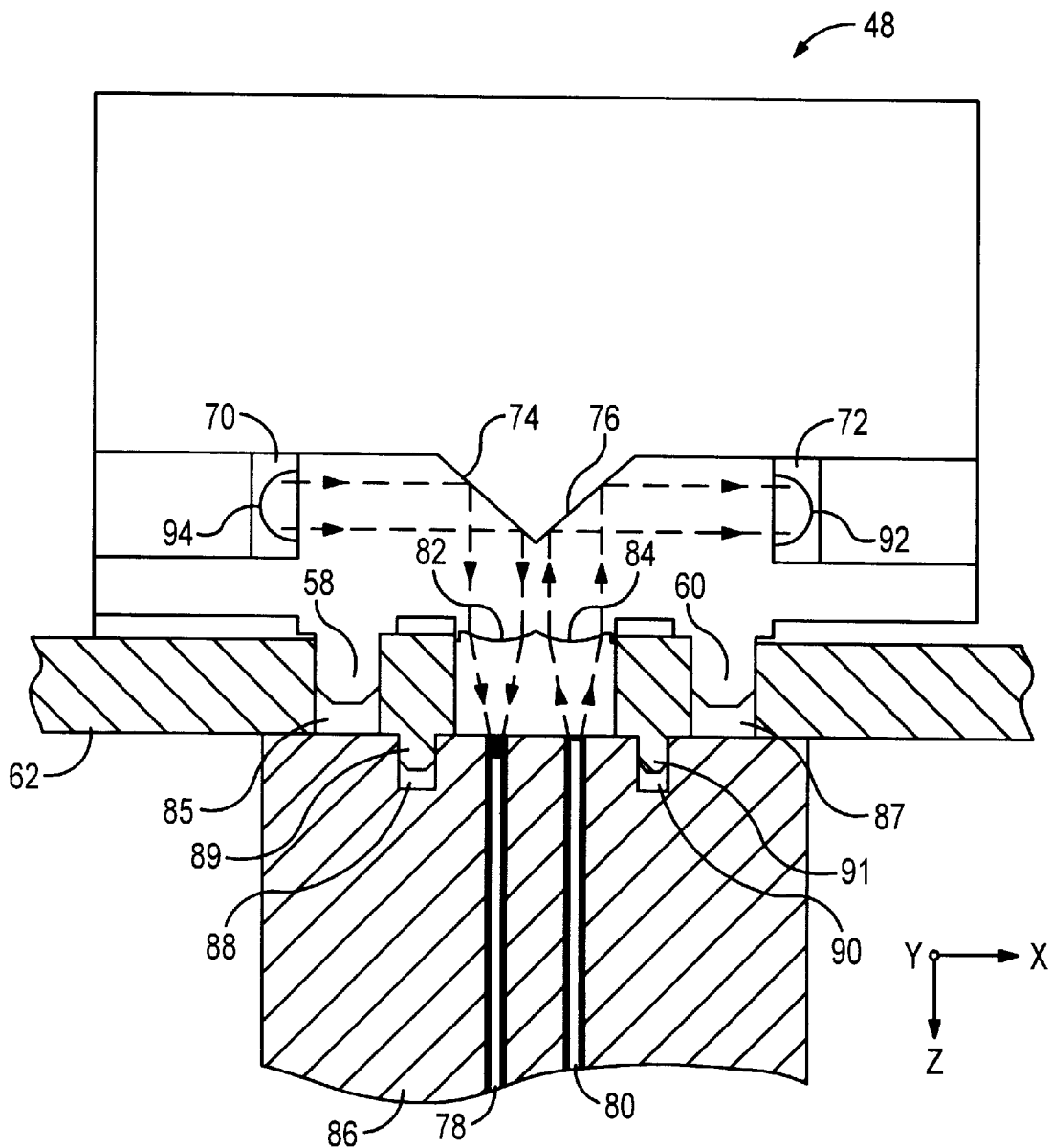
FIG. 6 is a top view of the optical member of FIG. 5 connected to a fiber-bearing ferrule.

Portions of the transmit and receive propagation paths are shown in FIG. 6. As noted briefly above, the alignment pins 58 and 60 of the optical member 48 are used to position a precision metal plate 62 having pin-receiving bores 85 and 87. The plate 62 includes a second pair of alignment pins 89 and 91. The transmit and receive fibers 78 and 80 are embedded in a ferrule 86 having bores 88 and 90 with a center-to-center spacing that matches the spacing between the two alignment pins 89 and 91 of the precision metal plate. When the ferrule is mated to the plate, the bores 88 and 90 receive the alignment pins 89 and 91, ensuring proper registration of the fibers 78 and 80 to the axes of the hyperbolic lenses 82 and 84. As indicated in FIG. 6, when a beam exits from the receive fiber 80, the beam diverges as it approaches the collimating lens 84. The lens collimates the light energy, which is reflected from the TIR surface 76 to the TIR surface of the sloping region 72. The arc 92 does not represent a structural feature. Instead, the arc represents the portion of the sloping region 72 that shows the impingement of the receive beam onto the TIR surface that redirects the beam to the Y direction. A similar arc 94 is shown for the transmit beam. The transmit beam is reflected by the TIR surface of the sloping region 70 from an upward direction to an inward direction and is reflected by the TIR surface 74 from the inward direction to the Z direction. The beam is focused by the hyperbolic lens 82 onto the transmit fiber 78.

In FIG. 6, the segments of the propagation paths between the hyperbolic lenses 82 and 84 and the TIR surfaces 74 and 76 will be referred to herein as "fiber-aligned segments." These segments extend in the Z direction. The segments that extend from the TIR surfaces 74 and 76 to the TIR surfaces of the sloping regions 70 and 72 will be referred to as the "intermediate segments." These segments propagate in the X direction and determine the center-to-center distance between the light source and the photodetector at the PCB level. The segment from the sloping regions 70 and 72 to the photodetector and light generator will be referred to as the "substrate-directed segments." These segments extend in the Y direction.

Figure 7:
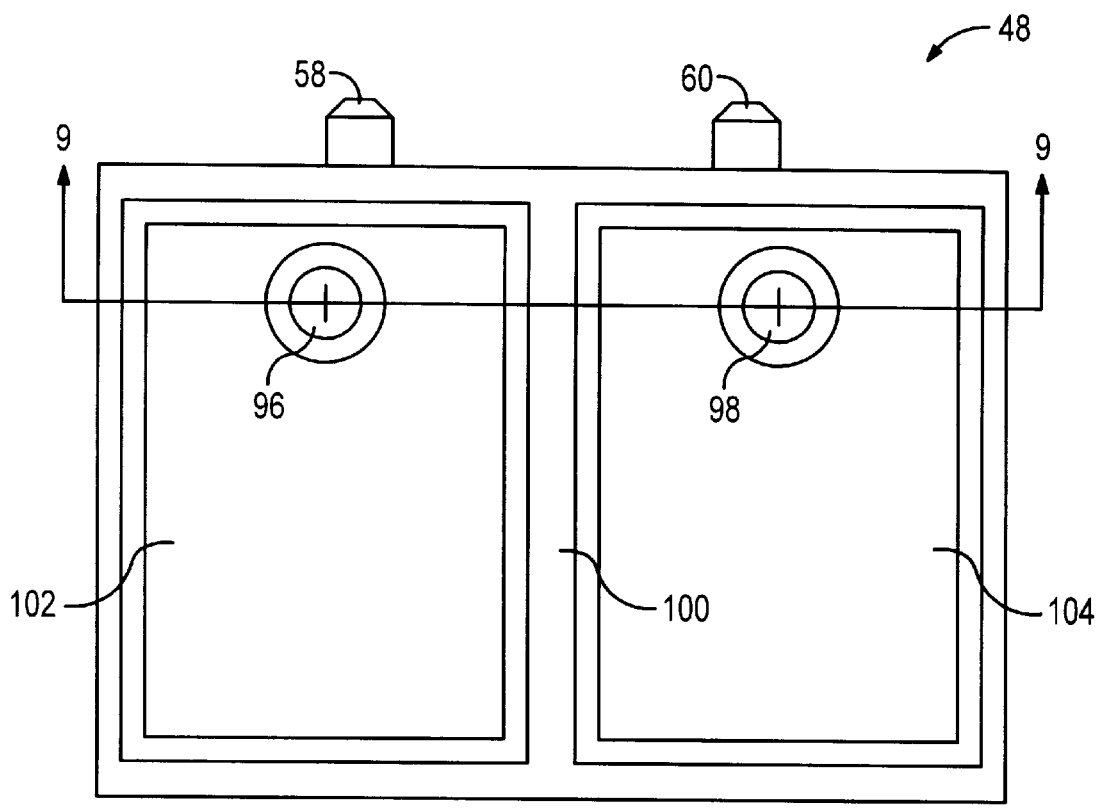
FIG. 7 is a bottom view of the optical member of FIG. 2.

Referring now to FIG. 7, the bottom view of the optical member 48 exposes the hyperbolic lenses 96 and 98 that are aligned with the light generator and the photodetector. As noted above, the center-to-center distance between the lenses 96 and 98 may be 6.2 mm. The lens 96 is the collimating lens for introducing optical signals from the light generator to the interior of the optical member. The lens 98 is the focusing lens for optical signals which exit from the optical member.

Figure 9:
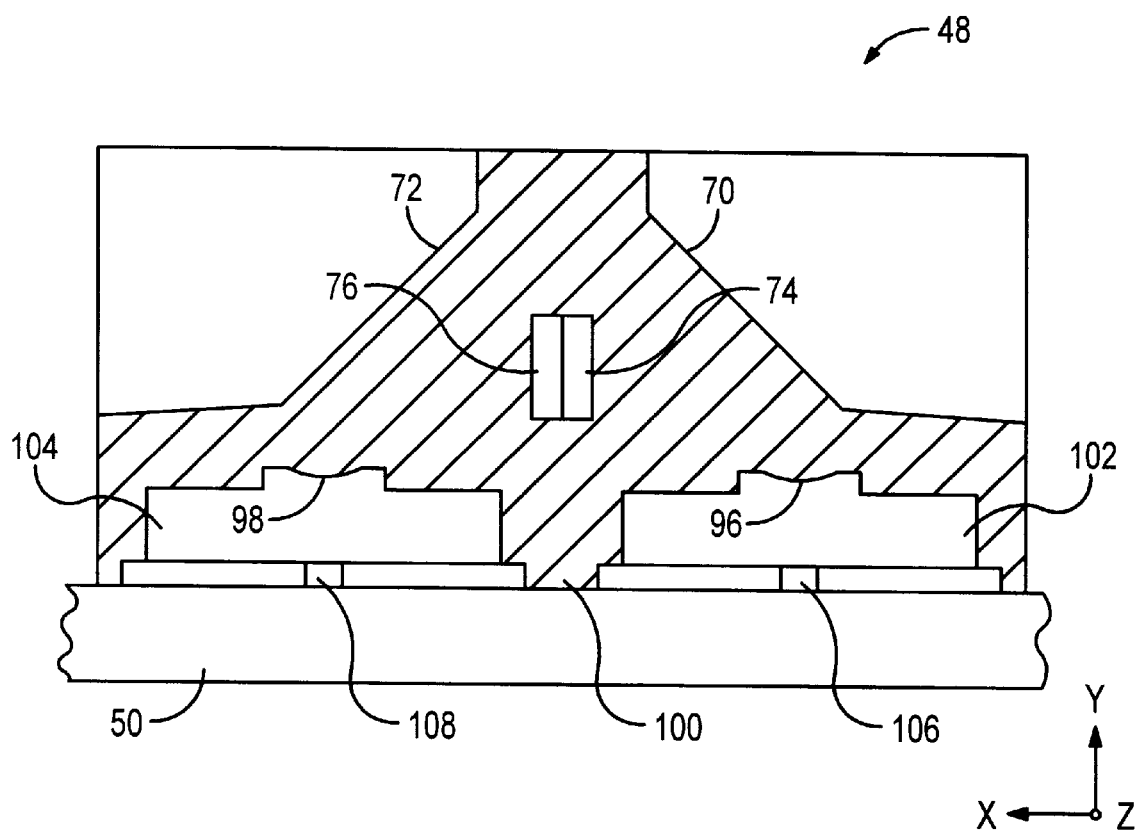
FIG. 9 is a back view of the optical member, taken along lines 9—9 in FIG. 7.

The molded member includes a wall 100 that separates the compartments for the light source and the photodetector. By providing separate compartments 102 and 104 for the electronic devices, the optical and electrical isolations of the transmitter and receiver operations are enhanced. The two compartments 102 and 104 may be seen more clearly in FIG. 9. FIG. 9 is a sectional view taken along lines 9—9 of FIG. 7, but with the optical member 48 being shown in an upright condition and being mounted to the PCB 50. Also mounted to the PCB are a light source 106 and a photodetector 108.

Figure 8:
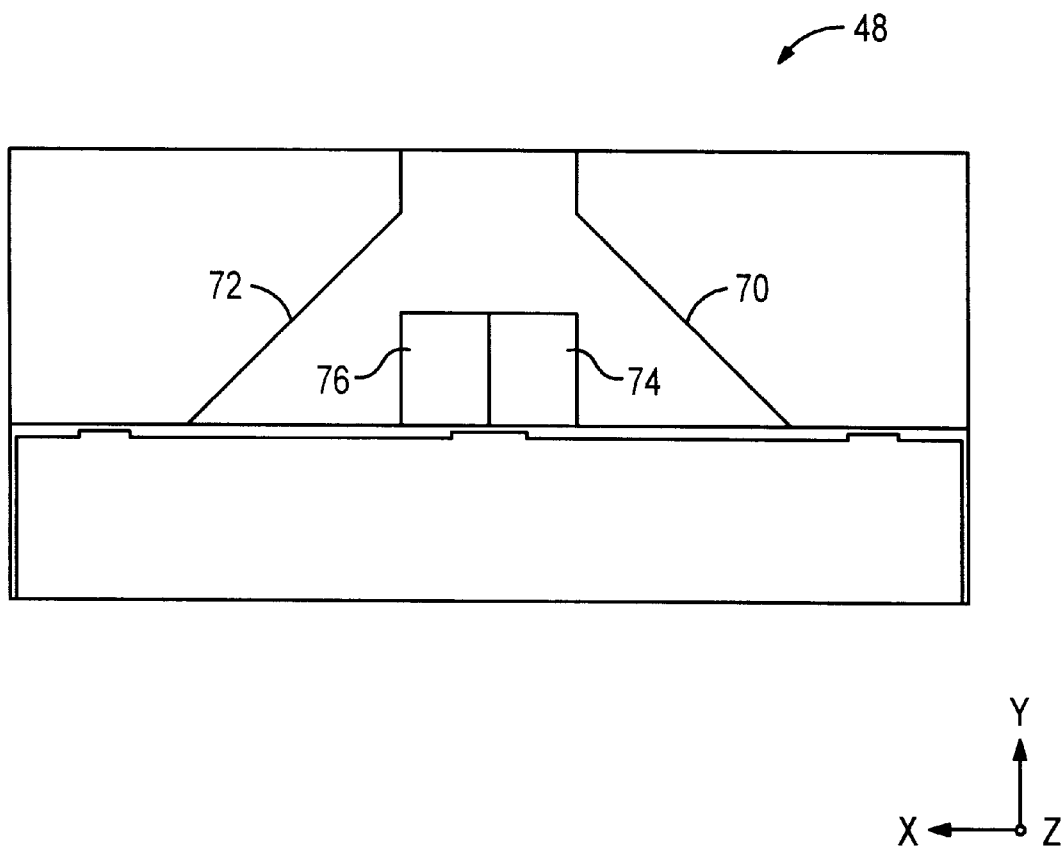
FIG. 8 is a back view of the optical member of FIG. 7.

The sectioning lines through the optical member 48 in FIG. 9 provide a clearer illustration of the V-shaped "inlet" that defines the 45° TIR surfaces 74 and 76. (The entire "inlet" is shown in FIG. 8.) In operation, optical signals generated by the light source 106 will undergo collimation upon reaching the hyperbolic collimating lens 96. The collimated beam will propagate in the Y direction until it impinges the TIR surface of the sloping region 70. The beam is then reflected at a right angle for propagation in the X direction. Reflection from the TIR surface 74 aligns beam propagation with the hyperbolic focusing lens 82 of FIG. 6. The lens 82 focuses the beam onto the transmit fiber 78.

Still referring to FIGS. 6 and 9, the optical signals from the receive fiber 80 direct a beam toward the hyperbolic collimating lens 84. The collimated beam is reflected from the Z direction to the X direction by the TIR surface 76. The beam is again redirected by the TIR surface of the sloping region 72. This second reflection positions the beam for downward propagation in the Y direction to the hyperbolic focusing lens 98. The beam is focused by the lens 98 onto the photodetector 108.

As previously noted, an advantage of the invention is that the photodetector 108 and the light source 106 are mounted directly to the PCB 50. These devices may be mechanically and electrically surface mounted using a silver epoxy to gold plating on the PCB. The result is that a more cost efficient arrangement is provided than achieved using the conventional TO cans to house the photodetector and light source.

What is claimed is:

1. An arrangement for coupling optical fibers to optical devices comprising:

a clear optical member having first and second substantially perpendicular surfaces and having transmit and receive light propagation paths extending between said first and second surfaces, each of said light propagation paths having at least three segments, said optical member including:

(a) a first pair of input/output (I/O) ports at said first surface, said first pair being configured for optical coupling to said optical fibers;

(b) a first pair of mirrors positioned with respect to said first pair of I/O ports for exchanging optical signals along first segments of said light propagation paths;

(c) a second pair of mirrors positioned with respect to said first pair of mirrors for exchanging said optical signals along second segments of said light propagation paths; and (d) a second pair of I/O ports positioned with respect to said second pair of mirrors for exchanging said optical signals along third segments of light propagation paths, said second pair of I/O ports being located on said second surface and having a port-to-port spacing that is greater than a port-to-port spacing of said first pair of I/O ports.

2. The arrangement of claim 1 further comprising a substrate positioned adjacent to said second pair of I/O ports, said substrate including a source of light having an optical axis aligned with a transmit port of said second pair of I/O ports, said substrate further including a detector having an optical axis aligned with a receive port of said second pair of I/O ports.

3. The arrangement of claim 2 wherein each I/O port of said first and second pair is a hyperbolic lens.

4. The arrangement of claim 2 wherein said optical member includes means for seating said optical member on said substrate such that said I/O ports of said second pair are in spaced relation to said detector and said source of light.

5. The arrangement of claim 1 wherein said first and second pairs of I/O ports and mirrors are cooperative to establish:
   (a) said first segments of said light propagation paths as being parallel to each other, perpendicular to said first surface, and parallel to said second surface;
   (b) said second segments as being axially aligned with each other and parallel to each of said first and second surfaces; and
   (c) said third segments as being parallel to each other, parallel to said first surface, and perpendicular to said second surface.

6. The arrangement of claim 1 wherein said optical member is a unitary molded plastic device.

7. The arrangement of claim 1 further comprising a ferrule in which said optical fibers are embedded, said optical member having means for precisely aligning said ferrule relative to said optical member such that said optical fibers are aligned with said first pair of I/O ports.

8. The arrangement of claim 1 wherein said optical member is a substantially transparent block and each said mirror is a total internal reflection (TIR) surface of said block.

9. An optical system comprising:
   a substrate having a light detector and a light source having optical axes perpendicular to a major surface of said substrate;
   a transmit fiber and a receive fiber having optical axes that are perpendicular to said optical axes of said light detector and said light source, said transmit and receive fibers being spaced apart by a distance less than a distance between said light detector and said light source; and
   a clear unitary optical block having four lenses and four TIR surfaces integrated therein to form mirror-image oppositely directed transmit and receive propagation paths between first and second lenses respectively aligned with said light source and said transmit fiber and between third and fourth lenses respectively aligned with said light detector and said receive fiber.

10. The optical system of claim 9 wherein said light detector and said light source are fixed directly on a surface of said substrate.

11. The optical system of claim 9 wherein axes of said first and third lenses are spaced apart by a greater distance than axes of said second and fourth lenses.

12. The optical system of claim 11 wherein said mirror-image oppositely directed transmit and receive propagation paths include:
   fiber-aligned segments that are generally parallel and that extend from said second and fourth lenses to second and fourth TIR surfaces, respectively;
   intermediate segments that are axially aligned, said intermediate segment of said transmit propagation path extending from said second TIR surface to a first TIR surface, said intermediate segment of said receive propagation path extending from said fourth TIR surface to a third TIR surface; and
   substrate-directed segments that are parallel and that extend from said first and third TIR surfaces to said first and third lenses, respectively.

13. The optical system of claim 12 wherein said parallel fiber-aligned segments follow X-direction axes, said intermediate segments are oppositely directed along a Y-direction axis, and said parallel substrate-directed segments follow Z-direction axes.

14. The optical system of claim 11 wherein said axes of said second and fourth lenses are spaced apart by 0.75 mm and said axes of said first and third lenses are spaced apart by at least 6.2 mm.

15. The optical system of claim 9 wherein said optical block is a unitary molded plastic device.

16. The optical system of claim 9 wherein said light source is one of a laser source and a light emitting diode.

17. The optical system of claim 16 wherein said light detector is a surface mounted photodiode.

* * * * *